United States Patent [19]

Nakano

[11] 4,199,243
[45] Apr. 22, 1980

[54] RELEASE MECHANISM FOR CAMERA

[75] Inventor: Yoshiyuki Nakano, Tokyo, Japan

[73] Assignee: Nippon Kogaku K.K., Tokyo, Japan

[21] Appl. No.: 941,163

[22] Filed: Sep. 11, 1978

[30] Foreign Application Priority Data

Sep. 19, 1977 [JP] Japan .................................. 52-111601

[51] Int. Cl.² .......................... G03B 1/18; G03B 17/42
[52] U.S. Cl. ..................................... 354/173; 354/204
[58] Field of Search ................................ 354/173, 171

[56] References Cited

U.S. PATENT DOCUMENTS

| | | | |
|---|---|---|---|
| 3,084,606 | 4/1963 | Goldberg | 354/173 |
| 3,693,526 | 9/1972 | Tenkumo et al. | 354/173 X |
| 3,903,534 | 9/1975 | Ito | 354/173 |
| 4,060,818 | 11/1977 | Furuta | 354/173 X |
| 4,118,659 | 10/1978 | Klemm | 354/173 X |

Primary Examiner—Michael L. Gellner
Assistant Examiner—Shelley Wade
Attorney, Agent, or Firm—Shapiro and Shapiro

[57] ABSTRACT

A release mechanism for camera of the type to which a motor winding unit may be selectively coupled to carry out rapid sequence film exposure is disclosed. The release mechanism is a constructed as a mechanical AND mechanism two inputs of which are changes in position of two members disposed within the camera body. One of the two members is an interlocking member interlocked with the operation of the shutter button and another is a movable member which moves to a predetermined position at the time of completion of winding motion. Therefore, the mechanical AND mechanism can drive the shutter system of the camera only when the winding is completed and the shutter button is pushed down.

10 Claims, 13 Drawing Figures

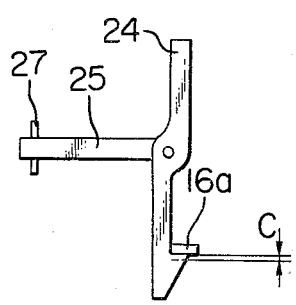
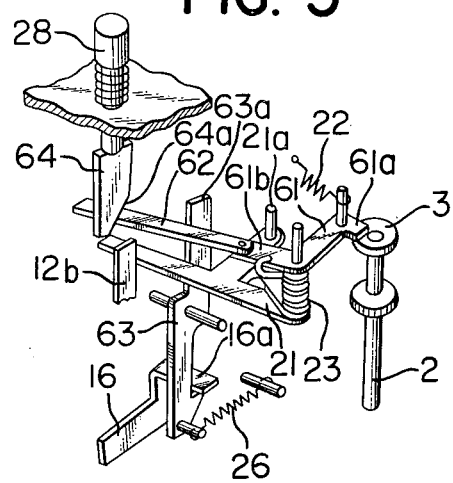
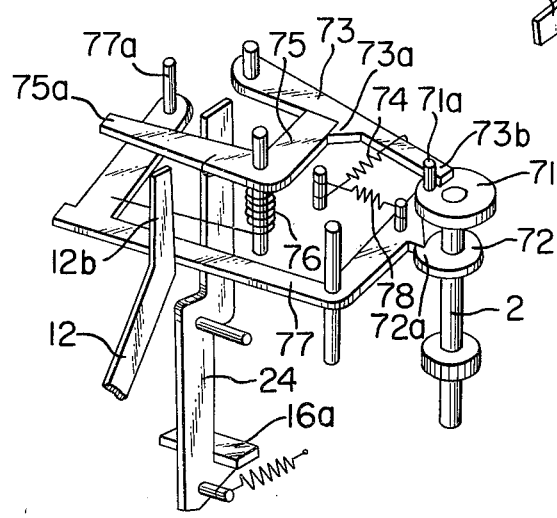
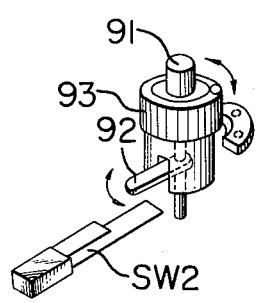
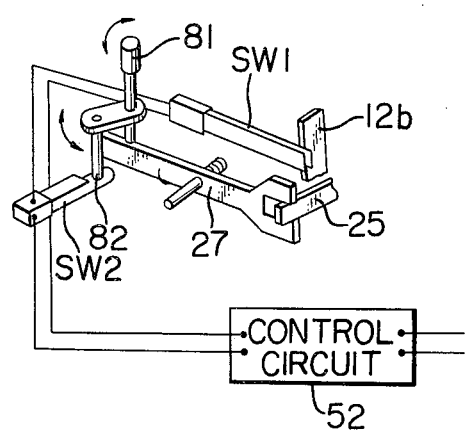

RELEASE MECHANISM FOR CAMERA

BACKGROUND OF THE INVENTION

1. Field of the Invention

The present invention relates to a release mechanism for such type of camera to which a motor winding unit may be selectively coupled to carry out rapid sequence film exposures. More particularly, the present invention relates to a release mechanism for mechanically transmitting the motion of a shutter button to a shutter system.

2. Description of the Prior Art

It is known in the art to attach a winding unit driven by a motor such as motor drive apparatus or autowinder to the main body of a camera having a hand operable winding member in order to carry out rapid sequence film exposures. A motor winding unit used for this purpose is conventionally so designed that after releasing the shutter, the motor of the unit drives the winding shaft of the camera and after completion of winding, a mechanism associated with the motor actuates mechanically the release mechanism provided within the main body of the camera. Therefore, the camera to which such a motor winding unit is adaptable must have a mechanical connecting means for operatively connecting the release mechanism within the camera body with the motor winding unit and a very complicated related mechanism for detecting the completion of winding and operating said mechanical connecting means through the rotation of the motor. For these reasons, it was necessary for such motor winding unit to have a large size. This constitutes an important disadvantage involved in the use of such motor winding unit.

SUMMARY OF THE INVENTION

Accordingly, it is a general object of the invention to provide an improved release mechanism which eliminates the above described disadvantage.

It is still more specific object of the invention to provide a novel type of release mechanism for a camera which makes the above mentioned connecting means and very complicated related mechanism unnecessary and which is very simple in structure but allows for rapid sequence film exposures when a motor winding unit is attached to the camera.

Other and further objects, features and advantages of the invention will appear more fully from the following description taken in connection with the accompanying drawings.

BRIEF DESCRIPTION OF THE DRAWINGS

FIG. 4 is a side view of the first and second release levers showing the second embodiment of the invention;

FIG. 5 is a perspective view of a part of the release mechanism including winding limit members showing the third embodiment of the invention;

FIG. 6 is a partial view similar to FIG. 5 showing the fourth embodiment;

FIGS. 7 and 8 show the fifth and sixth embodiments of the invention respectively.

DESCRIPTION OF THE PREFERRED EMBODIMENTS

Figure 1:
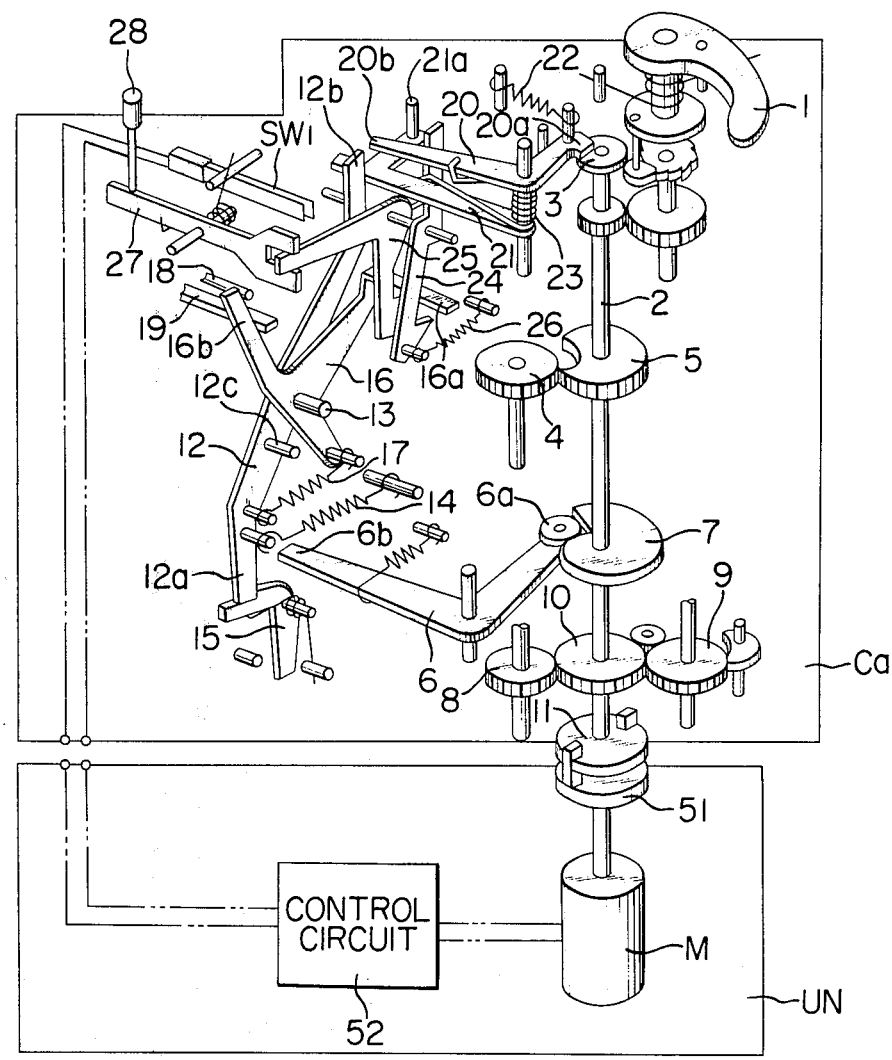
FIG. 1 is a perspective view showing the first embodiment of the invention.

In FIG. 1 showing a first embodiment of the present invention, Ca designates a camera body and UN designates a motor winding unit attached to the camera. Designated by 1 is a winding lever by which a winding shaft 2 is rotated clockwise. On the winding shaft 2 there are mounted a winding limit disk 3, a shutter charging gear 5, a charging cam 7, a film feeding gear 10 and a driven coupler 11. The rotation of the winding limit disk 3 is limited by a stopper pawl as described hereinafter. The gear 5 is in mesh with a shutter gear 4 and the gear 10 is in mesh with a sprocket gear 8 and a spool gear 9. The cam 7 cooperates with a cam lever 6. The driven coupler 11 is coupled with a driving coupler 51 of the motor winding unit UN.

The above mentioned cam lever 6 is pivotally mounted on a pivot pin and the one end 6a of the lever is in contact with the charging cam 7. The other end 6b of the lever is opposed to one end 12a of a charging lever 12 pivotally mounted on a shaft 13 and biased counter-clockwise by a spring 14. The one end 12a of the lever 12 abuts upon a stop lever 15 which keeps the lever 12 in the position shown against the force of the spring 14 until the stop lever is rotated counter-clockwise at the end of the running of a second blind (not shown). The end 12a of charging lever 12 thus rotated counter-clockwise is returned back its starting position shown in the drawing by the other end 6b of cam lever 6 against the action of the spring 14. Like the charging lever 12, a release lever 16 is pivotally mounted on the same pivot pin 13. A spring 17, one end of which is anchored on the charging lever 12, urges the release lever 16 to rotate clockwise. The release lever has first and second branch portions 16a and 16b. The first branch portion 16a is locked by first and second release locks respectively as described hereinafter. These release locks prevent the release lever 16 from being rotated clockwise by the action of the spring 17. When the release lever 16 is released from the first and second release locks, the second branch portion 16b of the lever 16 is allowed to rotate so as to move a mirror lifting pin 18 and a start lock 19 for a forward curtain of first blind (not shown).

Two levers, a winding limit lever 20 and a limit releasing lever 21 are rotatably mounted on the same shaft. The winding limit lever 20 is biased to rotate counter-clockwise by a spring 22 anchored at one end and has at its another end a winding stopper pawl 20a which can engage with a notch 3a formed on the above described winding limit disk 3. Between the two levers 20 and 21 there is disposed a spring 23 which urges the lever 20 to rotate clockwise and the lever 21 counter-clockwise. The charging lever 12 controls the movement of the limit releasing lever 21 through the projecting end 12b of the lever 12. When the charging lever 12 is brought into its retracted position, the one end 20b of the lever 20 comes into contact with a stop pin 21 on the free end of the lever 21 so that the bias force of the spring 23 is reduced to allow the winding limit lever 20 to rotate counter-clockwise under the action of the spring 22.

The above mentioned first and second release locks are designated by 24 and 25 respectively and rotatably mounted about the same shaft. The first release lock 24 has, at its one end, a hook portion engageable with the first branch portion 16a of the release lever 16. Another end of the first release lock is in contact with the end portion 20b of the winding limit lever 20 under the force of a spring 26. Like the first release lock, the second release lock 25 has, at its one end, a hook portion engageable with the first branch portion 16a of the lever 16. The other end of the second release lock 25 is controlled by a shutter button 28 through an interlocking lever 27. On-Off switch SW₁ is controlled by the end portion 12b of the charging lever 12 to transmit to the winding unit UN a signal informing it of the completion of running of the rear curtain or second blind, not shown. The motor winding unit UN comprises a motor M for driving the winding shaft 2 through a driving coupler 51 and a control circuit 52 which actuates the motor M in response to the above mentioned signal signifying completion of the running of the second blind and stops the power supply to the motor M when it detects the completion of winding by the winding shaft.

The manner of operation of the above described apparatus is as follows:

The above described camera is of the type which can be used alternatively for rapid sequence film exposures or for individual film exposures. For rapid sequence film exposures, the motor winding unit UN is attached to the main body of the camera Ca. For individual film exposures, the unit UN is removed from the camera body Ca. With reference to FIGS. 2A–2D and 3A–3C together with FIG. 1, a description will be made first as to the operation of picture-taking without using the motor winding unit UN.

Figure 2A:
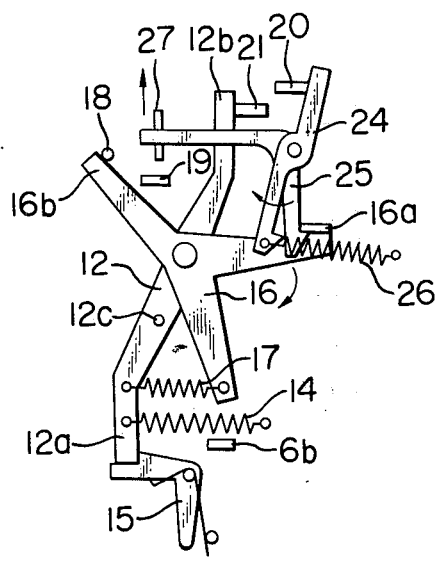
FIGS. 2A-2D are schematic illustrations explaining the operation of the essential parts of the first embodiment.
Figure 2B:
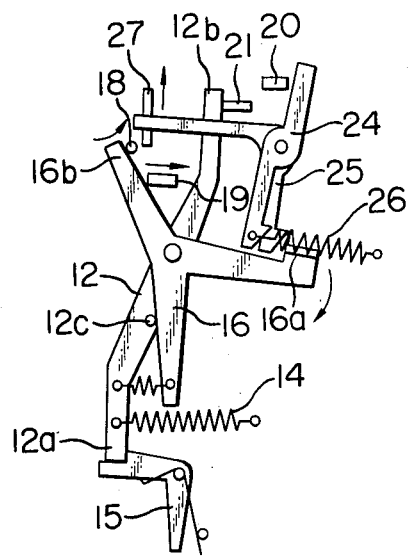
Figure 2C:
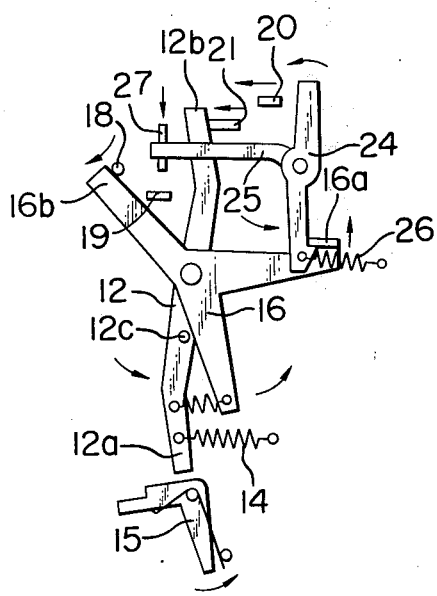
Figure 2D:
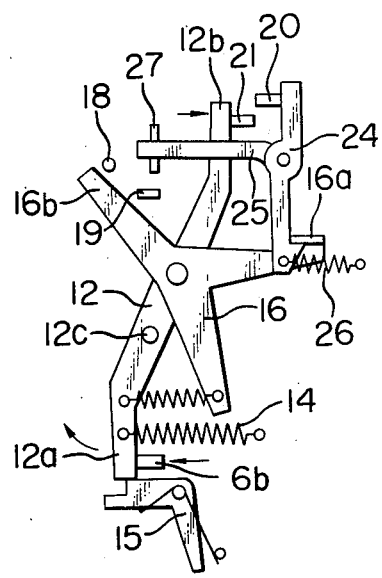

FIG. 1 and FIG. 2A show the apparatus in the position in which a winding of film has been finished. Pushing-down of the shutter button 28 in this position will cause the second release lock 25 to rotate clockwise so that its hook portion may be disengaged from the first branch portion 16a of the release lever 16. At this time, the hook portion of the first release lock 24 is not in engagement with the branch portion 16a. Therefore, the release lever 16 is allowed to rotate clockwise under the action of the spring 17. As a result, the mirror lifting pin 18 and then the first blind start lock 19 are moved rightward by the second branch portion 16b of the release lever as shown in FIG. 2B. In this manner, a mirror (not shown) is moved upward and the first blind (not shown) starts running in a known manner. Thereafter, the second blind (not shown) is started running by a shutter operating mechanism not shown and known per se. When an exposure is completed in this manner, the stop lever 15 is rotated counter-clockwise through a mechanism not shown. Thereby, as shown in FIG. 2C, the end portion 12a of the charging lever 12 is released from the locking engagement with the stop lever 15 and the charging lever 12 is allowed to rotate counter-clockwise under the action of the spring 14. As a result of this rotation of the charging lever, the release lever 16 is returned back to its starting position by a returning pin 12c standing on the charging lever 12 and therefore the mirror lifting pin 18 and the first blind start lock 19 are also returned to their starting positions. The rotation of the charging lever 12 also allows the limit releasing lever 21 to rotate counter-clockwise under the action of the spring 23 (see FIG. 1; the lever 21 moves leftward as viewed in FIG. 2C) because the lever 21 is released from the pressure of the end portion 12b of the release lever 12 against the rotation of the lever 21. As the limit releasing lever 21 rotates under the action of the spring 23, the pin 21a on the lever 21 moves leftward as viewed in FIG. 1 and comes into contact with the end 20b of the winding limit lever 20. Thereby, the force of spring 23 urging the lever 20 to rotate clockwise is reduced so that both the levers 20 and 21 may be rotated counter-clockwise together by the force of spring 22. As a result, winding stop pawl 20a at the end portion of the lever 20 is disengaged from the notch 3a of the winding limit disk 3 (see FIG. 3A).

When the winding limit lever 20 is rotated counter-clockwise, the spring 26 rotates the first release lock 24 counter-clockwise so that the lock 24 engages the first branch portion 16a, as shown in FIG. 2C, to hold it in the position to which it was returned by the rotation of the charging lever 12. In this manner, the mechanism is held in the rest position. Releasing the shutter button 28 in this rest position will cause the second release lock 25 to rotate counter-clockwise and to engage the first branch portion 16a as shown in FIG. 2C so that the first branch portion is held in the position shown by its engagement with the second release lock 25.

A winding operation is performed in the following manner.

Figure 3A:
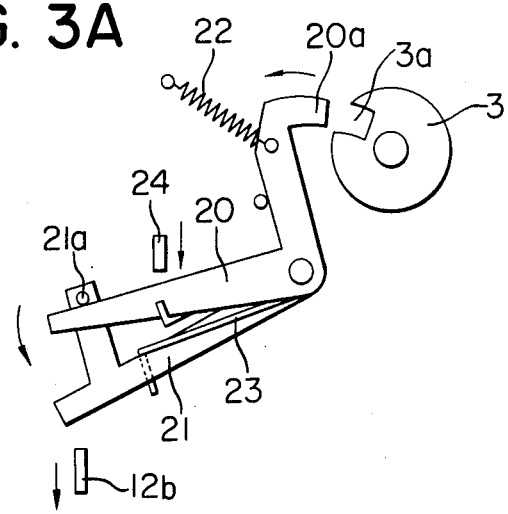
FIGS. 3A-3C are schematic illustrations explaining the operation of the essential parts of the first embodiment including winding limit members.
Figure 3B:
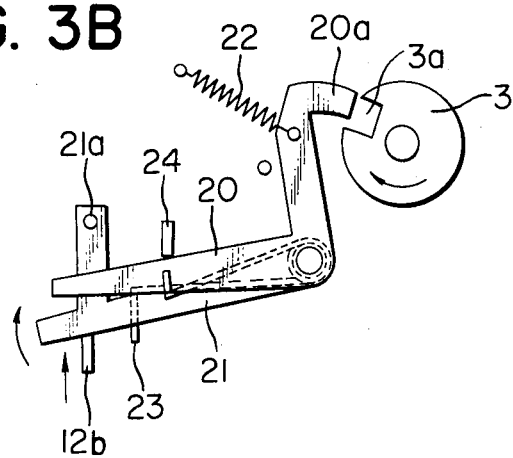
Figure 3C:
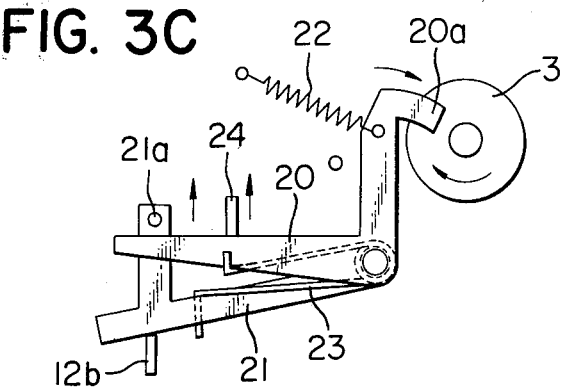

The operator rotates the winding lever 1 shown in FIG. 1 counter-clockwise from the position of mechanism shown in FIGS. 2C and 3A. By this rotation of the winding lever 1, the winding shaft 2 is rotated clockwise and the tooth portion of shutter charging gear 5 comes into mesh with the shutter gear 4 to rotate the latter. The rotation of the shutter gear 4 brings the shutter membranes (not shown) into a charged position. The rotation of the winding shaft 2 is also transmitted to the sprocket gear 8 and spool gear 9 through gear 10 to effect winding of the film by one frame by means of a mechanism well known in the art. Moreover, at the same time, the rotation of the winding shaft 2 is transmitted to the cam lever 6 through the cam 7. Thus, the cam lever 6 is rotated counter-clockwise during the time when the above mentioned shutter charging and film winding are carried out. This counter-clockwise rotation of the cam lever 6 causes the end portion 12a of charging lever 12 to move leftward against the force of spring 14 and others. Before this movement of the end portion 12a, the stop lever 15 has already been rotated clockwise as viewed in FIG. 1 back to its starting position and has been positioned to engage the charging lever 12. Therefore, when the charging lever is rotated by the cam lever 6, the tip end 12a of the lever 12 abuts upon the stop lever 15 and causes it to rotate counter-clockwise against the spring force (see FIG. 2D). On the other hand, the other end 12b of the lever 12 abutting against the limit releasing lever 21 causes the lever 21 to rotate clockwise so that the pin 21a on the lever 21 moves apart from the end portion 20b of the winding limit lever 20. When the pin 21a moves away from the end portion 20b, the force of the spring 23 urging the lever 20 to rotate clockwise overcomes the force of spring 22 and therefore the lever 20 is rotated clockwise. However, until this time point, with the rotation of the winding shaft 2, the winding limit disk 3 has been rotated up to the position in which the pawl 20a of the lever 20 can not come into engagement with the notch 3a on the disk 3. Therefore, the pawl 20a contacts only with the circumference of the disk 3 which prevents the lever 20 from being further rotated clockwise (see FIG.

3B). When a complete one rotation of the winding shaft 2 has been made to effect winding the film by one frame, the notch 3a of the disk 3 reaches the position opposed to the pawl 20a. Now, the pawl can engage in the notch 3a and the lever 20 is allowed to rotate clockwise (see FIG. 3C). Simultaneously with this rotation of the lever 20, the first release lock 24 in contact with the lever 20 returns to its starting position. At this time point, the end portion 12a of the charging lever 20 is already in a position beyond the stop lever 15. Therefore, further counter-clockwise rotation of the lever 12 can be prevented. Also, as a matter of course, the cam lever 6 returns to its starting position. Now, the apparatus is in the position shown in FIG. 1. In this manner, one operation for individual film exposure is finished.

Secondly, a description will be made as to the operation for rapid sequence film exposures with the motor winding unit UN being coupled to the camera body Ca.

Fundamentally, the operation for rapid sequence film exposures is the same as that for individual film exposures described above. Pushing-down the shutter button 28 from the position shown in FIGS. 1 and 2A will cause the second release lock 25 to rotate in the same manner as previously described. Then, the release lever 16 is rotated and the mirror lifting pin 18 and the first blind start lock 19 are shifted as shown in FIG. 2B. Upon the completion of exposure, the charging lever 12 is released from the stop engagement with the stop lever 15 and the lever 12 is allowed to rotate counter-clockwise under the action of spring 14. As a result, the release lever 16 is returned by the pin 12c to its starting position (see FIG. 2C) and also the limit releasing lever 21 rotates counter-clockwise (see FIG. 3A). This rotation of the lever 21 causes the winding limit lever 20 to rotate counter-clockwise and the first release lock 24 to rotate counter-clockwise also so as to lock the release lever 16. These operational motions of the related parts correspond to those described above for individual film exposures. However, for rapid sequence film exposure there is used the motor winding unit UN operatively connected to the mechanism in the main body Ca of camera. The above described counter-clockwise rotation of the charging lever 12 closes the switch $SW_1$ so that a signal signifying the completion of the running of the second blind (not shown) is given to the unit UN to actuate the motor M.

Now, motor M drives the winding shaft 2 into rotation clockwise through the driving coupler 51 and driven coupler 11. Therefore, shutter charging and film winding by one film are carried out in a similar manner to the previously described case where film winding is done by hand using the winding lever 1. Also, the cam lever is rotated counter-clockwise to return the limit releasing lever 21 and the winding limit lever 20 back to their starting positions. These stages of operation correspond to those previously described for the individual film exposures mode and shown in FIGS. 2D, 3B and 3C.

When one frame length of film has just been wound up, the winding shaft 2 is locked by locking members in the previously described manner and the winding shaft stops rotating. As the winding shaft 2 is locked, the winding torque is increased, which the control circuit 52 detects so that power supply to the motor M is cut off. If the operator has released the shutter button 28 at this time point, then the second release lock 25 will engage with the first branch portion 16a of the release lever 16 to lock it in the position. Therefore, the apparatus comes into the position shown in FIG. 1. However, the second release lock 25 can not lock the first branch portion 16a of the release lever 16 so long as the operator continues pushing the shutter button 28. Instead, when the winding limit lever 20 returns to its starting position shown in FIGS. 1 and 2A, the release lever 16 is disengaged from the first release lock 24 so that picture taking on the next frame of film may be effected continuously.

As seen from the foregoing, the shown release mechanism according to the invention becomes effective only when the first branch portion 16a of the release lever is disengaged not only from the second release lock 25 by pushing the shutter button 28 down but also disengaged from the first release lock 24 by the completion of winding.

While, in the embodiment shown, the winding shaft 2 is released from the locking engagement with the winding limit lever 20 through the movement of the charging lever 12 which rotates counter-clockwise at the time of the completion of shutter running, another member may be used to disengage the winding shaft from the limit lever. For example, a member which moves during the running of shutter and returns to its starting position during winding may be used for this purpose. This member may be the shutter gear 4 which is rotated counter-clockwise to bring the shutter into a charged position through the rotation of the winding shaft 2 and its rotated clockwise during the running of shutter. The shutter gear 4 may be designed in such a manner that the clockwise rotation of the gear 4 will cause the limit releasing lever 21 to rotate counter-clockwise so as to disengage the winding shaft 2 from the winding limit lever 20 and so that the counter-clockwise rotation of the gear 4 during shutter charging will cause the lever 21 to move rightward so as to lock the winding shaft 2 in position at the time of completion of winding.

As described above, the second release lock 25 in the shown embodiment can return to its starting position only after the first release lock 24 has engaged the first branch portion 16a to stop the rotation thereof (see FIGS. 1 and 2C). Therefore, there is a possibility of malfunction in that when the second release lock 25 returns to its starting position, its tip abuts against the side surface of the first branch portion 16a and the second lock 25 can not rotate properly to engage the first branch portion 16a, which may cause error of operation of the mechanism. Similar trouble may occur when the operator erroneously pushes the shutter button 28 down immediately before the completion of winding (in the position shown in FIG. 2D). In this case, the tip of hook portion of the second release lock 25 may abut against the side surface of the first branch portion 16a and therefore after the operator stops pushing the shutter button the second release lock may fail to return to its starting position correctly. FIG. 4 shows a second embodiment so designed as to prevent such troubles and to assure a higher reliability of operation.

In the position of the first and second release locks 24 and 25 shown in FIG. 4, the hook portion of the first release lock 24 is in contact with the first branch portion 16a of the release lever 16. The second one is about to return to its starting position. The contact surface between the hook portion of the first lock 24 and the first branch portion 16a is indicated by the upper one of two lines shown in FIG. 4 spaced from each other by a distance C. The lower line indicates the position which the upper surface of the hook portion of the second release hook 25 will take when the latter returns to its starting position. This distance C assures that the second release lock 25 correctly moves to its starting position and no interference occurs between the tip of hook portion of the second release lock 25 and the side surface of the first branch portion 16a during the returning movement of the second release lock 25 to its starting position.

However, the second embodiment described above may give rise to another problem. As previously described, for individual film exposures without using the motor winding unit UN, the release lever 16 is released from the locked state by the first release lock 24 and for rapid sequence film exposures using the unit UN it is released by the second release lock 25. Therefore, the arrangement of the first and second release locks 24 and 25 according to the second embodiment has a disadvantage in that the position at which the release lever 16 is released from the locked state for individual film exposures is different from the position at which the lever 16 is released for rapid sequence film exposures. If either one of the two release locks 25 and 24 is used also as a locking member for an automatic diaphragm lever, then the diaphragm opening may have different values for individual film exposures and for rapid sequence film exposures due to the difference of release position mentioned above. The third embodiment shown in FIG. 5 eliminates the disadvantage involved in the second embodiment.

According to the third embodiment, the release lever 16 is released from the locked state by the same release lock for both of individual film exposures and rapid sequence film exposures. In FIG. 5, the reference numeral 61 designates a winding limit lever corresponding to the winding limit lever 20 in the first embodiment. Like the lever 20, the winding limit lever 61 is supported pivotally by a pin and biased by a spring 22 to a counter-clockwise rotation. At the one end of the lever 61 there is provided a click 61a which can engage in the notch 3a of the winding limit disk 3. The spring force of spring 23 tends to rotate the winding limit lever 61 clockwise and the limit releasing lever 21 counter-clockwise. The winding limit lever 61 of the third embodiment features a summing lever 62 provided at the other end 61b of the lever 61. The summing lever 62 is swing movable and in contact with one end portion of a third release lock 63 which is provided in place of the first and second release locks 24 and 25 in the first embodiment. The third release lock 63 has a hook like portion at the other end thereof. Designated by 64 is an operating lever which is integrally connected with the shutter button 28. The operating lever 64 has a sloping surface 64a at its tapered portion. According to the arrangement of the third embodiment, the summing lever 62 becomes effective to rotate the third release lock 63 clockwise only when the click 61a of the winding limit lever 61 is in engagement with the notch 3a of the disk 3 and the shutter button is pushed down. For individual film exposures, the operator, starting from the position shown in FIG. 5, pushes down the shutter button 28, which in turn causes a downward movement of the operating lever 64. The summing lever 62 is then rotated clockwise by the slope surface 64a of the operating lever 64 and therefore the third release lock 63 is rotated also clockwise. As a result, the hook portion of the locking member 63 is moved apart from the branch portion 16a of the release lever 16 so that the latter is released from the locked state by the third release lock 63. Thus, exposure is effected in the same manner as in the first embodiment and then the charging lever 12 is stopped at the position in which the end 12b of the lever 12 is retracted leftward from the position shown in FIG. 5. Simultaneously with the retraction of the charging lever 12, the winding limit lever 61 is rotated counter-clockwise by the pin 21a so that the winding limit click 61a is disengaged from the notch 3a. After releasing the shutter button 28, the operator rotates the winding shaft 2 with the winding lever 1. As a result of this motion, the charging lever 12 is returned to its starting position and upon the film winding being completed, the click 61a again comes into engagement with the notch 3a. However, at this time point, the shutter button 28 has already been released and therefore the summing lever 62 is not in the position to prevent the third release lock 63 from rotating under the action of spring 26. Accordingly, the third release lock 63 does not rotate clockwise but contacts with the first branch portion 16a of the release lever 16 to hold it in the position shown in FIG. 5.

For rapid sequence film exposures using the motor winding unit UN, the mechanism of the third embodiment shown in FIG. 5 operates in the following manner.

Pushing-down of the shutter button 28 will cause the third release lock 63 to rotate clockwise so that exposure is effected in the same manner as that for individual film exposures. But, in case of rapid sequence film exposures, the motor is brought into operation by the counter-clockwise rotation of the charging lever 12. Also, at the same time, the click 61a is disengages from the notch 3a. The winding shaft 2 is allowed to rotate by the driving power of the motor M. When the end portion 12b of the charging lever 12 returns to its starting position shown in FIGS. 1 and 5, the winding limit lever 61 rotates clockwise and the click 61a again comes into engagement with the notch 3a. At this time point, the release lever 16 has already returned to its starting position shown in FIG. 5 and has been locked in position by the third release lock 63. Therefore, if the operator continues pushing the shutter button 28, the release lever 16 will be released again from the locked position by the third release lock 63 which is rotated clockwise by the summing lever 62 at the time when the winding limit click 61a comes into engagement with the notch 3a, that is, when the winding comes to an end. In this manner, the above described operation is cyclically repeated so long as the operator continues pushing the shutter button 28 and rapid sequence film exposures can be effected.

FIG. 6 shows another embodiment which is the same as the first embodiment in the point that two different release locking members are used to lock the release lever. Difference between the two embodiments is found in the structure of the lock releasing mechanism. FIG. 6 shows the mechanism in the position which it takes immediately before the completion of one winding motion. In the fourth embodiment shown in FIG. 6, a lock releasing disk 71 and a winding limit disk 72 are mounted on the winding shaft 2. Lever 73 is a lock releasing lever which is swing movable about a pivot and is biased clockwise by a spring 74. This lever 73 has a hook-shaped projection 73a at the middle portion of the lever and is controlled by a pin 71a standing on the lock releasing disk 71 with which pin the free end of the lever 73 is in contact. Designated by 75 is a release lock holding lever one end of which is locked by the above mentioned hook portion 73a of the lock releasing lever and the other end of which abuts against the first release lock 24. Between the end 12b of the charging lever 12 and the release lock holding lever 75 there is disposed a spring 76 the spring force of which tends to rotate the lever 75 clockwise. A winding limit lock 77 is biased counter-clockwise by a spring 78 and has, at its one end, a hook position in engagement with the hook portion 72a formed on the winding limit disk. Another end portion of the lock 77 abuts against the end portion 12a of the charging lever 12. Also, at another end portion, the lock member 77 has a pin 77a the function of which corresponds to that of the pin 21a in the first embodiment and serves to control the end 75a of the release lock holding member 75. As to the remaining parts, the structure and arrangement of the fourth embodiment correspond to those of the first embodiment.

The manner of operation of the fourth embodiment shown in FIG. 6 is as follows:

For individual film exposures for which the motor winding unit UN is removed from the camera body Ca, the operator at first rotates the winding lever 1 to complete the film winding. Since, as previously noted, the mechanism is shown in FIG. 6 in the position immediately before the completion of the winding, only a short clockwise rotation of the winding shaft 2 is required to complete the winding. With this rotation of the winding shaft 2, the lock releasing disk 71 rotates clockwise so that the pin 71a on the disk 71 causes the lock releasing lever 73 to rotate counter-clockwise. As a result, the release lock holding lever 75 is disengaged from the hook portion 73a and therefore the lever 75 is allowed to rotate clockwise under the action of spring 76. By this rotation of the lever 75, the first release lock 24 is also rotated clockwise so as to release the release lever 16 from the locking engagement with the first release lock. However, since the shutter button 28 has not yet been pushed down at this time point, the second release lock 25 (not shown in FIG. 6; see FIG. 1) locks the release lever 16 in the position. On the other hand, as soon as the release lock holding lever 75 is released from the locked state, the end 12b of the charging lever holds the winding limit lock 77 against counter-clockwise rotation and the lock 77 comes into engagement with the winding limit disk 72 so as to prevent the winding shaft 2 from rotating. This is the position which the mechanism takes when the winding is completed. Now, the apparatus is ready for the next picture-taking operation. Pushing-down of the shutter button 28 in this position of the apparatus will release the release lever 16 from the locking engagement with the second release lock 25 to effect exposure in the same manner as in the case of the first embodiment.

After the running of the second blind (not shown) and the stop lever 15 being rotated counter-clockwise, the charging lever 12 rotates counter-clockwise and thereby the hook portion of the winding limit lock 77 is disengaged from the hook portion 72a of the winding limit disk 72 by the force of spring 78. The counter-clockwise rotation of the lock 77 brings the pin 72a into contact with the end 75a of the lever 75 so that the latter is rotated counter-clockwise. Thus, the mechanism moves to the rest position. From this rest position, the winding shaft is rotated clockwise by rotating the winding lever 1 by hand. The end portion 12b of the charging lever 12 is moved rightward as viewed in FIG. 6 through the cam lever 6 and the hook portion of the winding limit lock 77 is brought into contact with the circumference of the winding limit disk 72. Since, as previously noted, the lock releasing lever 73 has been rotated counter-clockwise by the force of spring 74, the clockwise rotation of the lock 77 with pin 77a allows the release lock holding lever 75 to rotate clockwise under the force of spring 76 so as to engage with the hook portion 73a of the lever 73. This is the position of the mechanism immediately before the completion of winding shown in FIG. 6. A small further rotation of the winding shaft 2 will complete the winding and will bring the mechanism into the position prepared for carrying out individual film exposures.

For rapid sequence film exposures using the motor winding unit UN, the mechanism of the FIG. 6 embodiment operates in the following manner. For the sake explanation it is assumed that the winding has been completed by further rotating the winding shaft 2 clockwise from the position shown in FIG. 6.

In the position after the completion of winding, the operator pushes the shutter button 28 down to effect an exposure in the same manner as in the case of the above described individual film exposures. The charging lever 12 is rotated counter-clockwise (see FIG. 1) and thereby the motor M is brought into operation. The second release lock 25 can not lock the release lever 16 so long as the operator continues pushing the shutter button 28. Therefore, every time when the winding shaft 2 driven by the motor M comes to the position shown in FIG. 6 and the lock releasing lever is rotated counter-clockwise by the pin 71a, the above mentioned exposure is effected repeatedly because the release lever 16 is disengaged from the first release lock 24. In this manner, rapid sequence film exposures automatically proceed so long as the operator continues pushing the shutter button 28.

All the embodiments above shown and described are so designed that for individual film exposures the motor winding unit UN is disconnected from the camera body Ca and for rapid sequence film exposures it is connected with the camera body. If the operator wishes to carry out individual film exposures, that is, to take a picture on a one-by-one basis with the unit UN being coupled to the camera, then he must lock the release lever 16 by releasing the shutter button 28 prior to the completion of winding and the release of the lever 16 from the first release lock 24 or from the third release lock 63 (see FIGS. 1, 5 and 6). This is very difficult to perform and it is impossible to take a picture in a stable manner. The fifth embodiment shown in FIG. 7 is designed to solve this problem.

The fifth embodiment features a selection switch $SW_2$ with which the operator can select either one of individual film exposures and rapid sequence film exposures for the camera with the motor winding unit UN coupled thereto. The selection switch $SW_2$ is interposed in series between the switch $SW_1$ and the control circuit 52. A switch pin 82 rotatably mounted on the shutter button 81 controls the switch $SW_2$. The remaining parts of the mechanism of this embodiment correspond to those of the first embodiment.

Starting from the position of the mechanism shown in FIG. 7 with the motor winding unit UN being connected, the operator pushes down the shutter button 81 which makes the selection switch $SW_2$ open. In the same manner as described above, exposure is completed. After exposure, the first release lock 24 comes to the position to lock the first branch portion 16a of the release lever. At this time, the switch $SW_1$ is in its closed position but the selection switch $SW_2$ remains open because the shutter button continues to be pushed. Accordingly, the motor M also remains inoperative. Therefore there occurs no automatic advance to the next cycle of operation although the operator continues pushing the shutter button 81. When the operator releases thereafter the shutter button, the selection switch $SW_2$ is closed so that the motor M can start running to effect winding. Upon the completion of the winding, all the elements return to their starting positions shown in FIG. 1 and are held in the positions. Thus, individual film exposures are accomplished with the unit UN being coupled to the camera body.

To carry out rapid sequence film exposures, the operator turns the shutter button 81 so as to bring the switch pin 82 into a position outside of the switch $SW_2$. Now, the selection switch $SW_2$ remains closed and rapid sequence film exposures are carried out in the same manner as described previously regarding the first embodiment. The manner of operation of this rapid sequence film exposures need not be further described.

FIG. 8 shows a sixth embodiment modifying the fifth embodiment shown in FIG. 7. A switch pin 92 is integrally connected with the shutter button 91 and is movable up and down together with the latter. A guard ring 93 is disposed around the shutter button 91 and the switch pin 92 is moved between the operative position facing the selecting switch $SW_2$ and the inoperative position retracted from the area of the switch $SW_2$ by turning the guard ring 93. The other parts of the structure of the sixth embodiment shown in FIG. 8 correspond to those of the fifth embodiment and need not be further described.

As clearly seen from the foregoing, according to the invention, the release mechanism arranged in the main body of a camera is formed as a mechanical AND mechanism. Changes in position of a member which moves to a predetermined position at the time of completion of a winding operation and of a member which interlocked with and moved when a shutter button is pushed constitute two inputs of the mechanical AND mechanism. Therefore, the AND mechanism drives the shutter system only when the winding is completed and the shutter button is pushed down. In case that the motor winding unit is disconnected from the camera body, the shutter system lock can be released to effect individual film exposures by pushing the shutter button down after the completion of winding. On the contrary, in case that the motor winding unit is connected to the camera body, the shutter system lock can be released to effect rapid sequence film exposures automatically every time one film winding step by the motor is completed, by maintaining the shutter button depressed.

According to the invention, mechanical connecting means conventionally provided within the motor winding unit for operating the release mechanism and the related mechanism for operating the mechanical connecting means through the rotation of the motor become unnecessary and therefore a substantial reduction in size of the motor winding unit is attainable. Moreover, as described above, the AND mechanism according to the invention can drive the shutter system only by using the changes in position of the above mentioned two members as inputs of the mechanism and therefore the AND mechanism is simple in structure and saves space within the camera body.

A further simplification of the mechanism of the invention can be attained when a member which is moved at the completion of winding to limit the operation of the film winding mechanism also has the function of detecting the completion of winding in addition to the function of limiting the winding operation.

While the invention has been particularly shown and described with reference to preferred embodiments thereof, it will be understood by those skilled in the art from the foregoing that changes in form and details can be made therein without departing from the spirit and scope of the invention.

What I claim is:

1. A release mechanism for a camera of the type which is capable of coupling a motor film winding unit thereto comprising:

shutter action means which is movable between a first action position and a second action position, the shutter action means causing a shutter to run when the shutter action means shifts to the second action position;

means urging the shutter action means towards the second action position;

lock means which is movable between a lock position where the lock means engages the shutter action means to lock the shutter action means at the first action position and a release position where the shutter action means is released by the lock means for movement to the second action position;

film winding means which includes a winding shaft adapted to be coupled to a film winding unit, the winding shaft having limit means secured thereto operable for limiting the rotation of the winding shaft;

first control means operable to move the shutter action means back to its first action position at the end of shutter running; and second control means engageable with the first control means and the lock means and operable by the first control means to move between a limit means engaging position wherein the second control means engages the limit means to prevent rotation of the winding shaft and a limit means disengaging position wherein the second control means is disengaged from the limit means to permit rotation of the winding shaft, the second control means being moved from its limit means engaging position to its limit means disengaging position in response to the movement of the first control means in moving the shutter action means back to the first action position, the second control means being further operable to cause the lock means to move to the lock position to lock the shutter action means in the first action position when the second control means moves to the limit means disengaging position, thereby locking the shutter action means during film winding.

2. A release mechanism according to claim 1, which is characterized in that one winding operation is completed by one rotation of the winding shaft.

3. A release mechanism according to claim 1, which is characterized in that said release mechanism further comprises a first switch for driving the motor after the completion of shutter operation and a second switch for alternatively selecting a position in which the output signal of said first switch is allowed to enter the motor or another position in which said output signal is prevented from entering the motor until the shutter button is released from pushing pressure on it.

4. A release mechanism according to claim 1, which is characterized in having means to lock an automatic diaphragm lever in its open position and wherein a predetermined diaphragm value can be obtained by releasing the lock.

5. A release mechanism according to claim 1, further comprising switch means operable by the first control means when the first control means returns the shutter action means to its first position, to initiate the operation of a motor in a film winding unit coupled to the camera.

6. A release mechanism according to claim 1, further comprising means engaging the winding shaft operable for causing the second control means to move to its limit means engaging position at the conclusion of film winding.

7. A release mechanism according to claim 6, further comprising resilient means urging the second control means toward its limit means disengaging position.

8. A release mechanism according to claim 1, wherein the limit means comprises a disc attached to the winding shaft and having a notch therein, and wherein the second control means includes first and second levers pivoted for rotation about an axis with resilient means urging the two levers to rotate in opposite directions, the first lever having a pawl engageable with the notch of the disc means to prevent rotation of the winding shaft when the second control means is in the limit means engaging position.

9. A release mechanism according to claim 8, wherein the first control means comprises a third lever pivoted for rotation about an axis and movable between first and second control positions, the third lever engaging the second lever of the second control means to hold the first lever of the second control means in the limit means engaging position when the third lever is in the first control position, and operable to allow the first lever of the second control means to move to the limit means disengaging position when the third lever moves to the second control position.

10. A release mechanism according to claim 1, wherein the lock means comprises first and second lock means, the first lock means being movable between a lock position and a release position in response to the operation of a shutter release button, the first lock means locking the shutter action means at the first action position when in the lock position and releasing the shutter action means for movement to the second action position when in the release position, the second lock means being operable by the movement of second control means to the limit disengaging position to lock the shutter action means in the first action position during film winding.

* * * * *